US012510662B2

(12) United States Patent
Lepage (10) Patent No.: US 12,510,662 B2
(45) Date of Patent: Dec. 30, 2025

(54) VOLUMETRIC INSPECTION USING ROW-COLUMN ADDRESSED PROBE

(71) Applicant: Evident Canada, Inc., Québec (CA)

(72) Inventor: Benoit Lepage, L'Ancienne-Lorette (CA)

(73) Assignee: Evident Canada, Inc., Québec (CA)

( * ) Notice: Subject to any disclaimer, the term of this patent is extended or adjusted under 35 U.S.C. 154(b) by 254 days.

(21) Appl. No.: 18/260,990

(22) PCT Filed: Jan. 26, 2022

(86) PCT No.: PCT/CA2022/050104
§ 371 (c)(1),
(2) Date: Jul. 11, 2023

(87) PCT Pub. No.: WO2022/165583
PCT Pub. Date: Aug. 11, 2022

(65) Prior Publication Data
US 2024/0061108 A1  Feb. 22, 2024

Related U.S. Application Data

(60) Provisional application No. 63/181,428, filed on Apr. 29, 2021, provisional application No. 63/146,280, filed on Feb. 5, 2021.

(51) Int. Cl.
*G01S 15/89* (2006.01)

(52) U.S. Cl.
CPC ...... *G01S 15/8925* (2013.01); *G01S 15/8927* (2013.01)

(58) Field of Classification Search
CPC ............. G01S 15/8913; G01S 7/52036; G01S 7/52028; G01S 15/8925; G01S 15/8927; G01S 7/5202; G01S 15/8993; G01N 29/4427; G01N 29/262; G01N 29/043; G01N 2291/106
See application file for complete search history.

(56) References Cited

U.S. PATENT DOCUMENTS

| 6,692,439 B1 | 2/2004 | Walker et al. |
| 7,608,776 B2 * | 10/2009 | Ludwig ............. G10H 1/348 |
| | | 84/746 |
| 11,289,639 B2 * | 3/2022 | Gilbert ............... H01B 1/00 |

(Continued)

FOREIGN PATENT DOCUMENTS

| EP | 3682810 | 7/2020 |
| WO | WO-2022165583 A1 | 8/2022 |

OTHER PUBLICATIONS

"International Application Serial No. PCT/CA2022/050104, International Search Report mailed Apr. 26, 2022", 4 pgs.
"International Application Serial No. PCT/CA2022/050104, Written Opinion mailed Apr. 26, 2022", 4 pgs.
"Canadian Application Serial No. 3,208,443, Examiners Rule 86(2) Report mailed Oct. 31, 2024", 4 pgs.

(Continued)

*Primary Examiner* — Daniel L Murphy
*Assistant Examiner* — Amie M Ndure
(74) *Attorney, Agent, or Firm* — Schwegman Lundberg & Woessner, P.A.

(57) ABSTRACT

An ultrasound probe is capable of detecting flaws in an object in a non-destructive manner. The probe includes a row-column addressed (RCA) array with a plurality of row and column electrodes. The probe can perform volumetric inspection of an object using the RCA array in different transmission and reception configurations.

17 Claims, 11 Drawing Sheets

(56) References Cited

U.S. PATENT DOCUMENTS

| | | | |
|---|---|---|---|
| 2005/0046584 A1* | 3/2005 | Breed ................ | B60N 2/02246 |
| | | | 340/13.31 |
| 2006/0167595 A1* | 7/2006 | Breed ................ | B60R 21/0152 |
| | | | 701/1 |
| 2006/0208169 A1* | 9/2006 | Breed .................... | G01S 15/88 |
| | | | 250/221 |
| 2006/0217864 A1* | 9/2006 | Johnson ............... | B60N 2/1817 |
| | | | 701/45 |
| 2007/0086624 A1* | 4/2007 | Breed .............. | B60R 21/01552 |
| | | | 382/104 |
| 2012/0095343 A1 | 4/2012 | Smith et al. | |
| 2015/0087991 A1* | 3/2015 | Chen ................... | G01S 7/52025 |
| | | | 330/253 |
| 2018/0246207 A1 | 8/2018 | Brown et al. | |
| 2019/0326501 A1* | 10/2019 | Gilbert .................... | C04B 35/45 |
| 2020/0064468 A1 | 2/2020 | Holbek et al. | |
| 2020/0397511 A1* | 12/2020 | Ishrak .................. | A61F 2/2427 |

OTHER PUBLICATIONS

"European Application Serial No. 22748753.5, Extended European Search Report mailed Nov. 20, 2024", 10 pgs.

"Canadian Application Serial No. 3,208,443, Response filed Feb. 25, 2025 to Examiners Rule 86(2) Report mailed Oct. 31, 2024", 32 pgs.

"European Application Serial No. 22748753.5, Response filed Jun. 10, 2025 to Extended European Search Report mailed Nov. 20, 2024", w/ claims, 10 pgs.

\* cited by examiner

VOLUMETRIC INSPECTION USING ROW-COLUMN ADDRESSED PROBE

CROSS-REFERENCE TO RELATED APPLICATIONS

This application is a U.S. National Stage filing under 35 U.S.C. 371 from International Application No. PCT/CA2022/050104, filed on Jan. 26, 2022, which claims the benefit of priority to U.S. Provisional Patent Application No. 63/146,280, filed Feb. 5, 2021, and U.S. Provisional Patent Application Ser. No. 63/181,428, filed Apr. 29, 2021, the contents of which are incorporated herein by reference.

TECHNICAL FIELD

The present disclosure generally relates to ultrasound probes performing volumetric inspection using a row-column addressed ("RCA") probe.

BACKGROUND

Ultrasound technology can be used for inspecting objects, ranging from pipes to human bodies. Some inspection techniques, such as those using a two-dimensional transducer, can have limitations, though. Using a two-dimensional transducer may present a tradeoff between resolution, acoustic frequency, and a lack of focusing. As an illustrative example, use of a two-dimensional transducer typically cannot provide a very high-resolution image, obtained using a high frequency, and providing high focus throughout the image to display the granular details of the object under test.

While RCA probes can provide higher-resolution images, they can be limited in their application such as in the use of beam steering. These limitations can impact the ability of RCA probes to perform volumetric inspection of objects.

BRIEF DESCRIPTION OF THE DRAWINGS

Various ones of the appended drawings merely illustrate example implementations of the present disclosure and should not be considered as limiting its scope.

DETAILED DESCRIPTION

Detecting flaws and imperfections at difficult locations in a non-destructive manner can provide a challenge for generally available inspection techniques. Moreover, performing volumetric inspection of an object can also be difficult. The inventor has recognized, among other things, that such challenges can be addressed at least in part by an inspection probe with a row-column addressed (RCA) array as described herein. Examples of the present subject matter allow for volumetric inspection of an object using an RCA array in different transmission and reception configurations. For transmission, a subset of elements of the RCA array may each be used to transmit a pulse signal. The subset of elements may be non-adjacent elements so that the time of flight information corresponding to the position of the subset of elements and different locations inside the object can be used to perform the volumetric inspection.

This document describes an apparatus including a row-column addressed (RCA) array including a matrix of transducer elements arranged in rows and columns. The apparatus also includes a control circuit comprising outputs to generate, during a transmission event, transmission signals to drive a plurality of separate apertures in the RCA array, wherein the apertures are defined by a subset of the transducer elements within the RCA array. For the transmission event, the plurality of separate apertures include at least two adjacent apertures separated by at least one non-driven transducer element.

This document also describes a method comprising: in a transmission event, drive a plurality of separate apertures in a RCA array to transmit a pulse signal, the apertures being defined by a first subset of transducer elements of the RCA array, wherein for the transmission event, the separate apertures include at least two adjacent apertures separated by at least one non-driven transducer element; and for reception, control the RCA array to receive reflections of the transmitted pulse using a second subset of transducer elements of the RCA array.

This document further describes an inspection system including a RCA array with a plurality of transducer elements to transmit and receive ultrasound waves. The inspection system also includes a control circuit configured to control the RCA array to perform volumetric inspection of an object using a plurality of acquisition contexts. In each acquisition context, the control circuit is configured to drive the RCA array to transmit a common pulsing sequence using separate apertures. And each acquisition context uses a different subset of transducer elements of the RCA array for reception as compared to each other.

Figure 1:
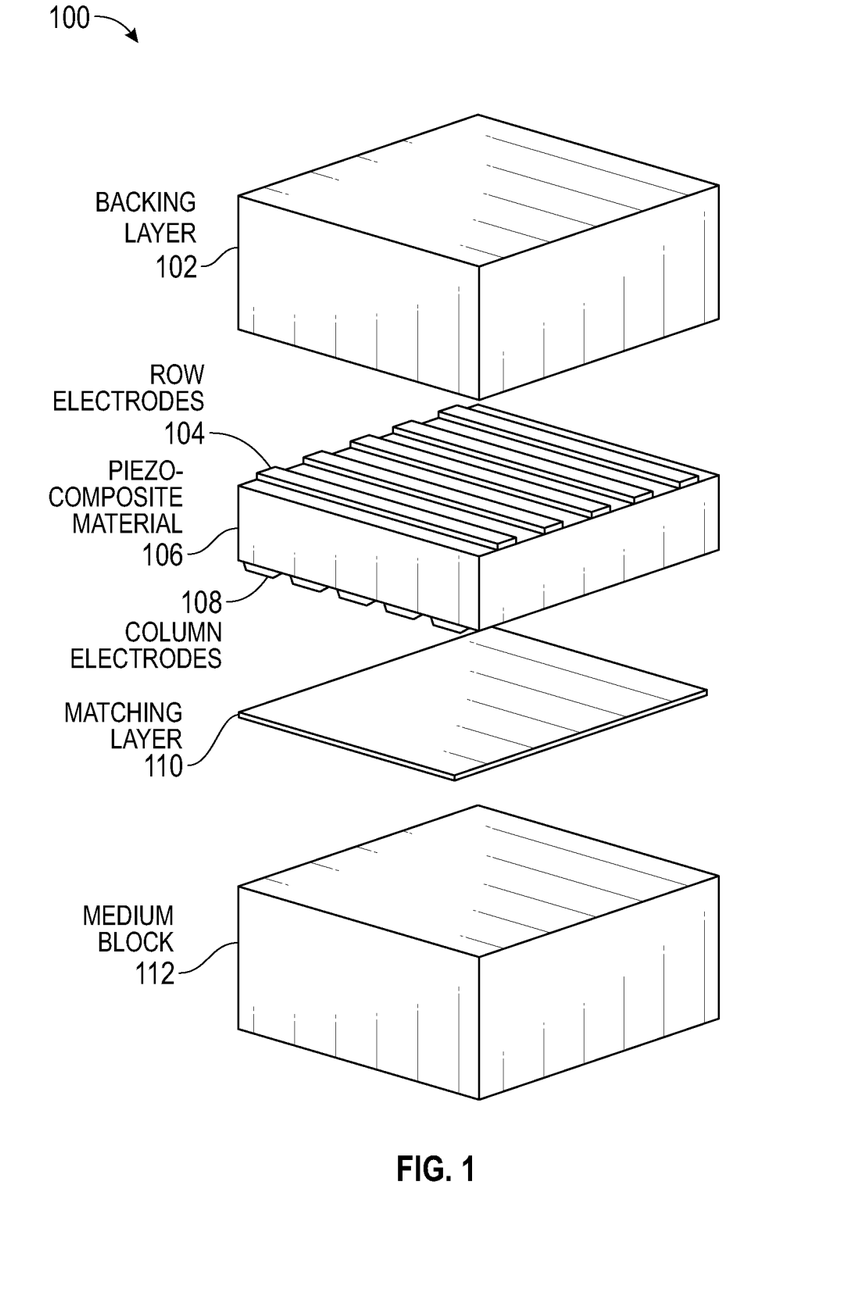
FIG. 1 illustrates an RCA array according to an example of the present subject matter.

FIG. 1 illustrates an RCA array 100, according to an example of the subject matter. The RCA array 100 may include a backing layer 102, row electrodes 104, a piezo-composite material 106, column electrodes 108, a matching layer 110, and a medium block 112. The backing layer 102 may be provided on a top side of the RCA array 100. The row electrodes 104 and column electrodes 108 may be attached to opposing sides of the piezo-composite material 106 using a variety of coupling techniques. For example, the row and column electrodes 104, 108 may be imprinted directly on the piezo-composite material 106 or may be provided on a flexible circuit, which is then connected to the piezo-composite material 106. For example, channels and elements may be provided on the piezo-composite material 106 coupled by a flexible printed circuit board. The piezo-composite material 106 may be monolithic or may be segmented into smaller regions.

The row electrodes 104 may include a plurality of line electrodes arranged in parallel, and the column electrodes 108 may include a plurality of line electrodes arranged in parallel. The row electrodes 104 and column electrodes 108 may be arranged substantially perpendicular or orthogonal to each other, forming an array with elements or pixels provided at the intersections of the row and column electrodes 104, 108. As explained below, the row and column electrodes 104, 108 may generate and transmit ultrasound waves and/or may receive reflections or echoes of those ultrasound waves.

The matching layer 110 may be provided underneath the column electrodes 108. The matching layer 110 may provide acoustic impedance matching. And the medium block 112 may be provided on a bottom side of the RCA array 100. A medium block 110, for example, may be provided as a wedge.

Figure 2:
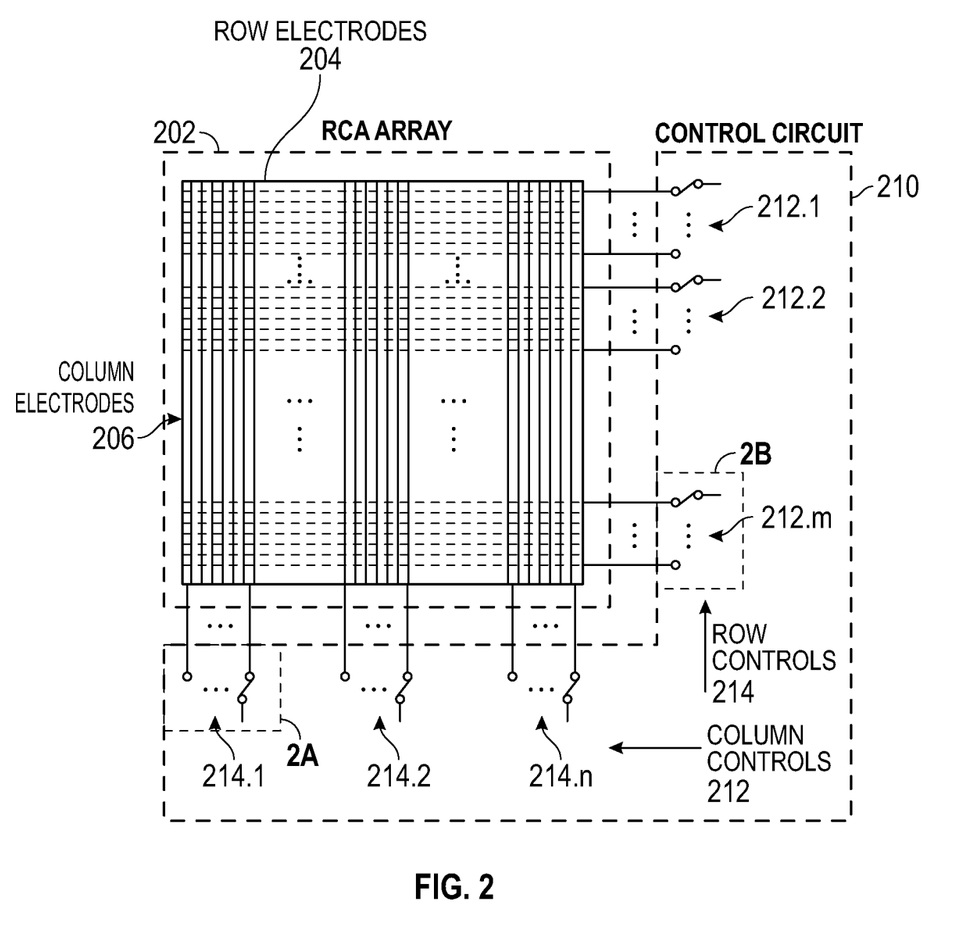
FIG. 2 illustrates a block diagram of an ultrasound probe according to an example of the present subject matter.

FIG. 2 illustrates a schematic block diagram of an ultrasound probe 200, according to an example of the subject matter. The ultrasound probe 200 may include an RCA array 202 and a control circuit 210. For example, the RCA array 202 may be provided as the RCA array 100 of FIG. 1 described above. The RCA array 202 may include column electrodes 206 and row electrodes 204. The row electrodes 204 may include M number of line electrodes arranged in parallel, and the column electrodes may include N number of line electrodes arranged in parallel; hence, the RCA array 202 may include M×N array of elements or pixels.

The control circuit 210 may be coupled to the RCA array 202 and may control the operations of the RCA array 202. The control circuit 210 may be provided as an integrated circuit providing multilevel pulse signals and other states to control the states of the RCA array 202.

The control circuit 210 may include a first set of switches 212.1-212.m, with each switch of the first set of switches 212.1-212.m coupled to a respective row of the row electrodes 204. The control circuit 210 may also include a second set of switches 214.1-214.n, with each switch of the second switches 214.1-214.n coupled to a respective column of the column electrodes 206.

In an example, the first set of switches 212.1-212.m may provide reception control for the RCA array 202. For example, to set an active reception area, a subset of the first set of switches 212.1-212.m may be set to a reception state so that the corresponding row electrodes are coupled to an output of the RCA array 202 while the other row electrodes may be set to a high impedance state. Also, the intersecting columns electrodes for the active reception area may be set to a ground state while the other column electrodes may be set to a high impedance state. The intersection of the active row and column electrodes may define the active reception area or reception aperture.

In an example, the second set of switches 214.1-214.n may provide transmission control for the RCA array 202. For example, to set an active transmission area, a subset of the second set of switches 214.1-214.n may be set to transmission state so that the corresponding column electrodes are coupled to an excitation signal, such as a pulse signal, while the other column electrodes may bet set to a high impedance state. Also, the intersecting row electrodes for the active transmission area may be set to a ground state while the other row electrodes may be set to a high impedance state. The intersection of the active column and row electrodes may define the active transmission area or transmission aperture.

Moreover, the control circuit 202 may provide more robust control to have multiple transmission and reception configurations using the techniques disclosed in application Ser. No. 16/833,793, entitled "Ultrasound Probe with Row-Column Addressed Array," which is incorporated herein by reference in its entirety; the incorporation by reference being made with the following exception: In the event that any portion of the above-referenced application is inconsistent with this application, this application supersedes the above-referenced application.

Figure 2A:
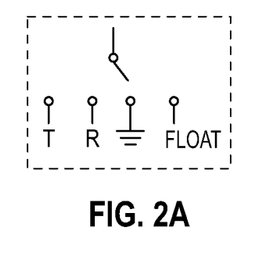
FIG. 2A illustrates a switch configuration according to an example of the present subject matter.
Figure 2B:
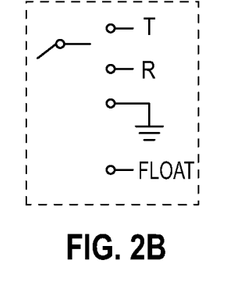
FIG. 2B illustrates a switch configuration according to an example of the present subject matter.
Figure 3A:
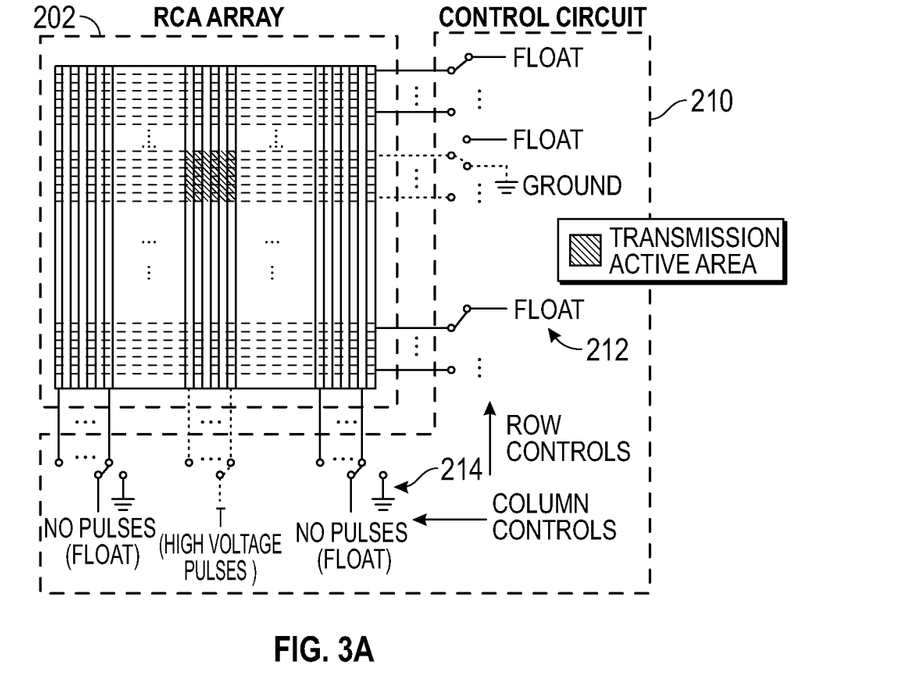
FIG. 3A illustrates a transmission configuration of an ultrasound probe according to an example of the present subject matter.
Figure 3B:
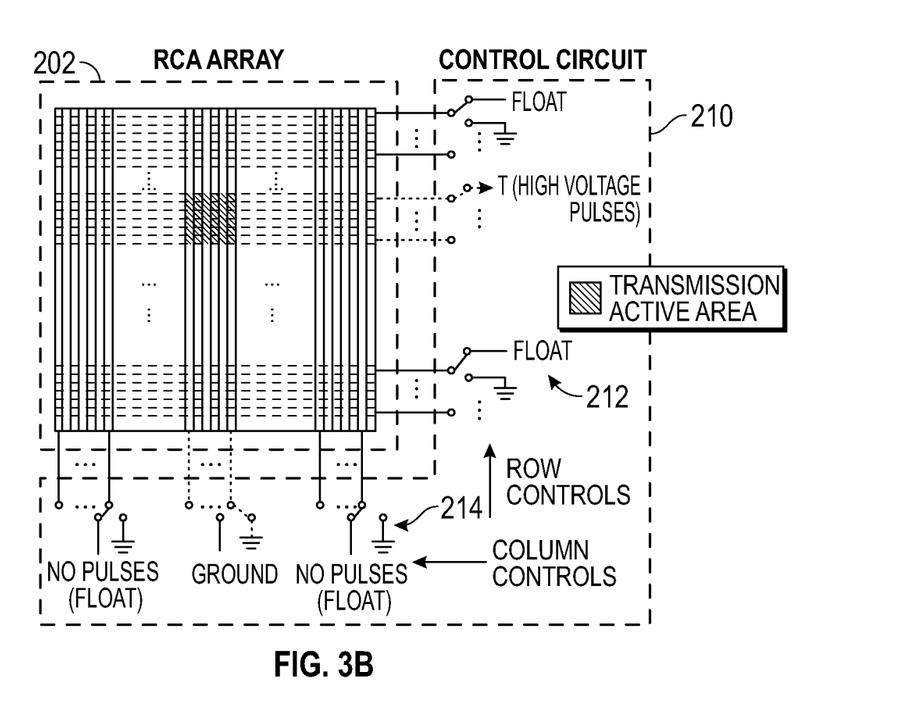
FIG. 3B illustrates a transmission configuration of an ultrasound probe according to an example of the present subject matter.
Figure 4A:
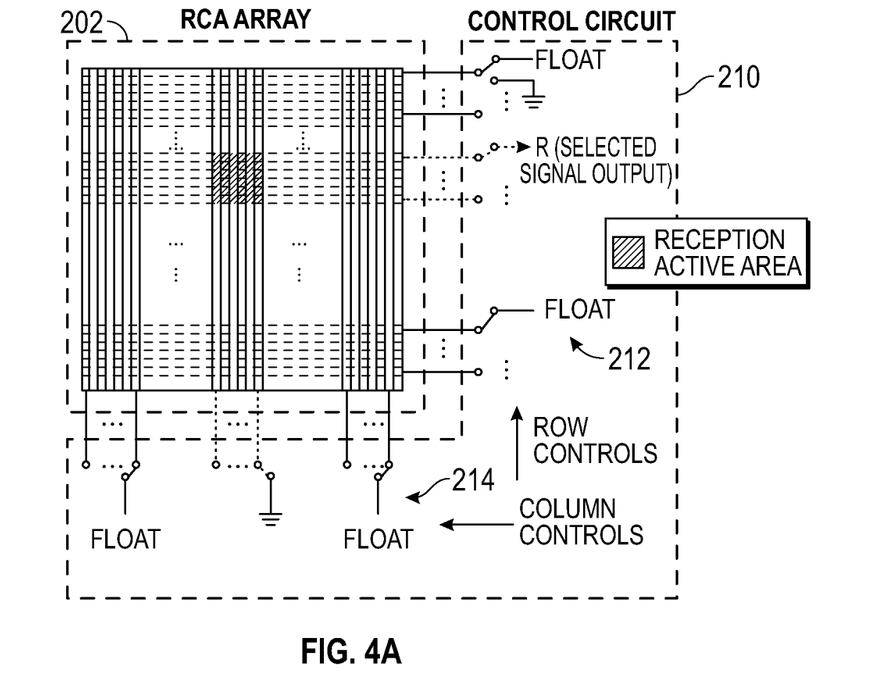
FIG. 4A illustrates a reception configuration of an ultrasound probe according to an example of the present subject matter.
Figure 4B:
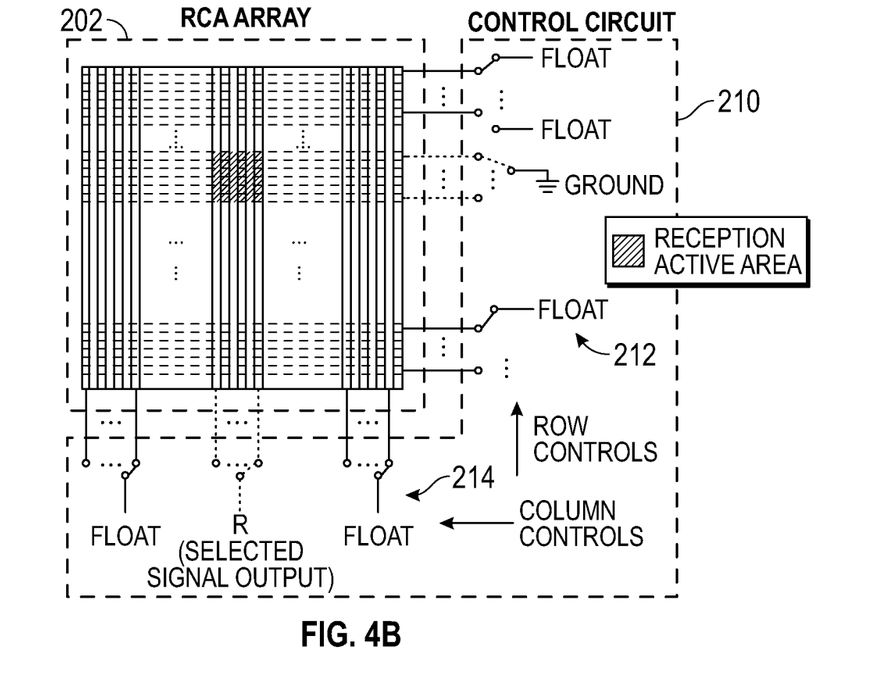
FIG. 4B illustrates a reception configuration of an ultrasound probe according to an example of the present subject matter.

FIGS. 2-4 illustrate examples of the different transmission and reception configurations. FIG. 2A illustrates a switch of the first set of switches 212.1-212.m, according to an example of the subject matter. Each switch of the first set of switches 212.1-212.m may have four possible connections, thereby operating the coupled row electrode in one of four states depending on the switch connection: 1) a transmission state, 2) a reception state, 3) a ground state, and 4) a high impedance (float) state.

FIG. 2B illustrates a switch of the second set of switches 214.1-214.n according to an example of the present subject matter. Each switch of the second set of switches 214.1-214.n may have four possible connections, thereby operating the coupled column electrode in one of four states depending on the switch connection: 1) a transmission state, 2) a reception state, 3) a ground state, and 4) a high impedance (float) state.

In a transmission state, the respective switch may couple the row/column electrode to an excitation signal, e.g., a high voltage pulse signal. In a reception state, the respective switch may couple the row/column electrode to an output of the RCA array 202. The output of the RCA array 202 may be coupled to signal processing components, such as an analog-to-digital converter and a processor, to process the received signal from the RCA array 202. For example, the processor may execute a time of flight (ToF) based technique using the output of the RCA array. In a ground state, the respective switch may couple the row/column electrode to ground, which may be a reference node at a fixed reference potential. In a high impedance state, the respective switch may couple the row/column electrode to a high impedance, such that the coupled row/column electrode may electrically function in substantially an open state (i.e., a floating node).

The switches 212.1-212.M, 214.1-214.N may be provided as multiplexers, logic devices, or the like. Moreover, different pulse signals may be provided in the transmission state. The different pulse signals may have different magnitudes and/or different duty cycles.

FIGS. 3A and 3B illustrate different transmission configurations of the ultrasound probe 200 according to examples of the present subject matter. FIG. 3A illustrates a first transmission configuration, where selected column electrodes may be driven while selected row electrodes may be coupled to ground, such that the intersection of the selected column and row electrodes define a transmission aperture. Here, a first set of column electrode switches 214 may set the selected column electrodes to a transmission state by coupling to an excitation signal, such as a pulse signal, and a second set of column electrode switches 214 may set the remaining column electrodes to a high impedance state. Similarly, a first set of row electrode switches 212 may set the selected row electrodes to a ground state, and a second set of row electrode switches 212 may set the remaining row electrodes to a high impedance state.

FIG. 3B illustrates a second transmission configuration, where selected row electrodes may be driven while selected column electrodes may be coupled to ground, such that the intersection of the selected column and row electrodes define the transmission aperture. Here, a first set of row electrode switches 212 may set the selected row electrodes to a transmission state by coupling to an excitation signal, such as a pulse signal, and a second set of row electrode switches 212 may set the remaining row electrodes to a high impedance state. Similarly, a first set of column electrode switches 214 may set the selected column electrodes to a ground state, and a second set of column electrode switches 214 may set the remaining column electrodes to a high impedance state.

The intersection of the first set of rows and columns, in either the first or second transmission configuration, may define a transmission aperture. If there are no delays, the transmission aperture may operate as a single transmitting element. As described further below, delays may be added for beam steering, for example.

FIGS. 4A and 4B illustrate different reception configurations of the ultrasound probe 200 according to examples of the present subject matter. FIG. 4A illustrates a first reception configuration, where selected row electrodes may be used for reception while selected column electrodes may be coupled to ground, such that the intersection of the selected row and column electrodes define a reception aperture. Here, a first set of row electrode switches 212 may set the selected row electrodes to a reception state by coupling to an output of the RCA array 202, and a second set of row electrode switches 212 may set the remaining row electrodes to a high impedance state. Similarly, a first set of column electrode switches 214 may set the selected column electrodes to a ground state, and a second set of column electrode switches 214 may set the remaining column electrodes to a high impedance state.

FIG. 4B illustrates a second reception configuration, where selected column electrodes may be used for reception while selected row electrodes may be coupled to ground, such that the intersection of the selected column and row electrodes define the reception aperture. Here, a first set of column electrode switches 214 may set the selected column electrodes to a reception state by coupling to an output of the RCA array 202, and a second set of column electrode switches 214 may set the remaining row electrodes to a high impedance state. Similarly, a first set of row electrode switches 212 may set the selected row electrodes to a ground state, and a second set of row electrode switches 212 may set the remaining column electrodes to a high impedance state. The intersection of the first set of rows and columns, in either the first or second reception configuration, may define a reception aperture.

In the discussion above with reference to FIGS. 2-4, a rectangular shaped aperture (active area) was selected. The use of a single rectangular shaped aperture may produce a linear array that is oriented in a certain direction, but it may limit beam steering. That is, beam steering may be limited to 0 degrees or 90 degrees, depending on the transmission/reception configurations described above. Thus, a single rectangular shaped aperture may be used to detect transverse flaws (0 degrees) or longitudinal flaws (90 degrees) with respect to the axis of the testing object, but may be limited in detecting flaws at other angles (say, 45 degrees).

Figure 5:
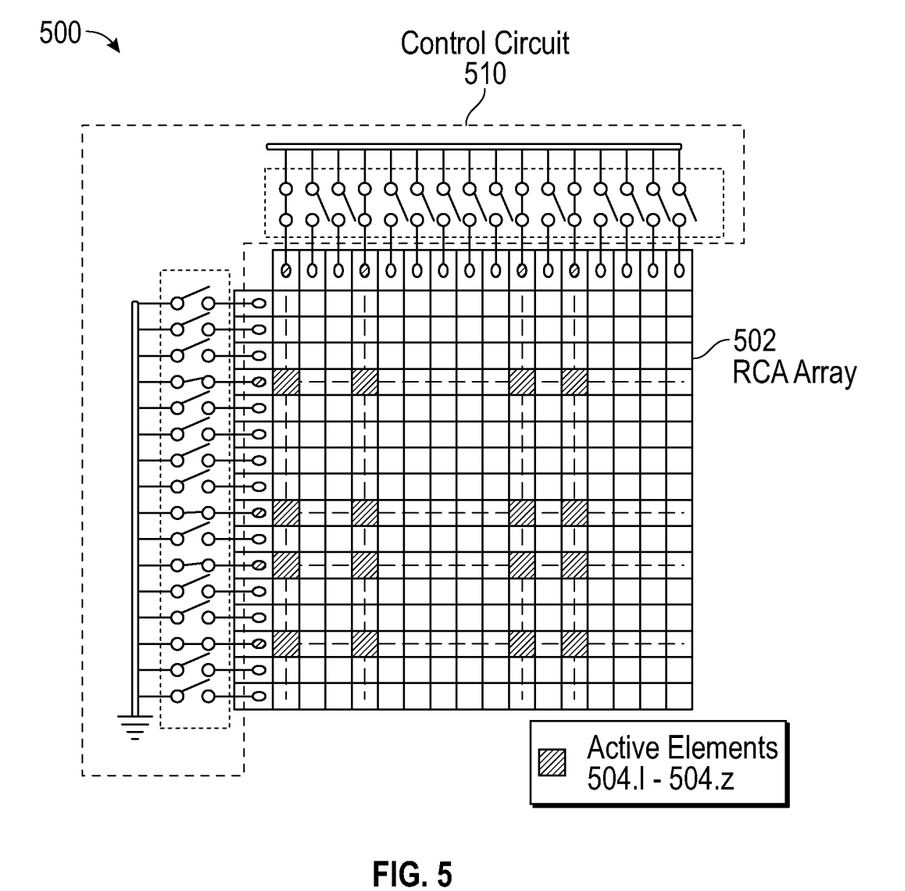
FIG. 5 illustrates a transmission configuration of an RCA array adapted for volumetric inspection according to an example of the present subject matter.

FIG. 5 illustrates a transmission configuration of an RCA probe 500 adapted for volumetric inspection, according to an example of the subject matter present subject matter. The RCA probe 500 may include an RCA array 502 and a control circuit 510. Multiple, separate transmission apertures may be used by the RCA probe 500 in a transmission mode. An aperture may include one or more adjacent (or contiguous) elements of the RCA array. In an example, the separate apertures may include at least two adjacent apertures separated by at least one non-driven transducer element In the example shown in FIG. 5, a subset of multiple, non-adjacent elements 504.1-504.Z of the RCA array are activated using the control circuit 510 and each active element may operate as a separate aperture. The control circuit 510 may generate transmission signals to drive the active elements. Each active element 504.1-504.N, as described in further detail below, may transmit a pulse (or pulse sequence). In an example, the multiple, separate apertures may each include one or more adjacent elements, but that group of elements in a respective aperture may be non-adjacent with elements of other apertures.

Figure 6:
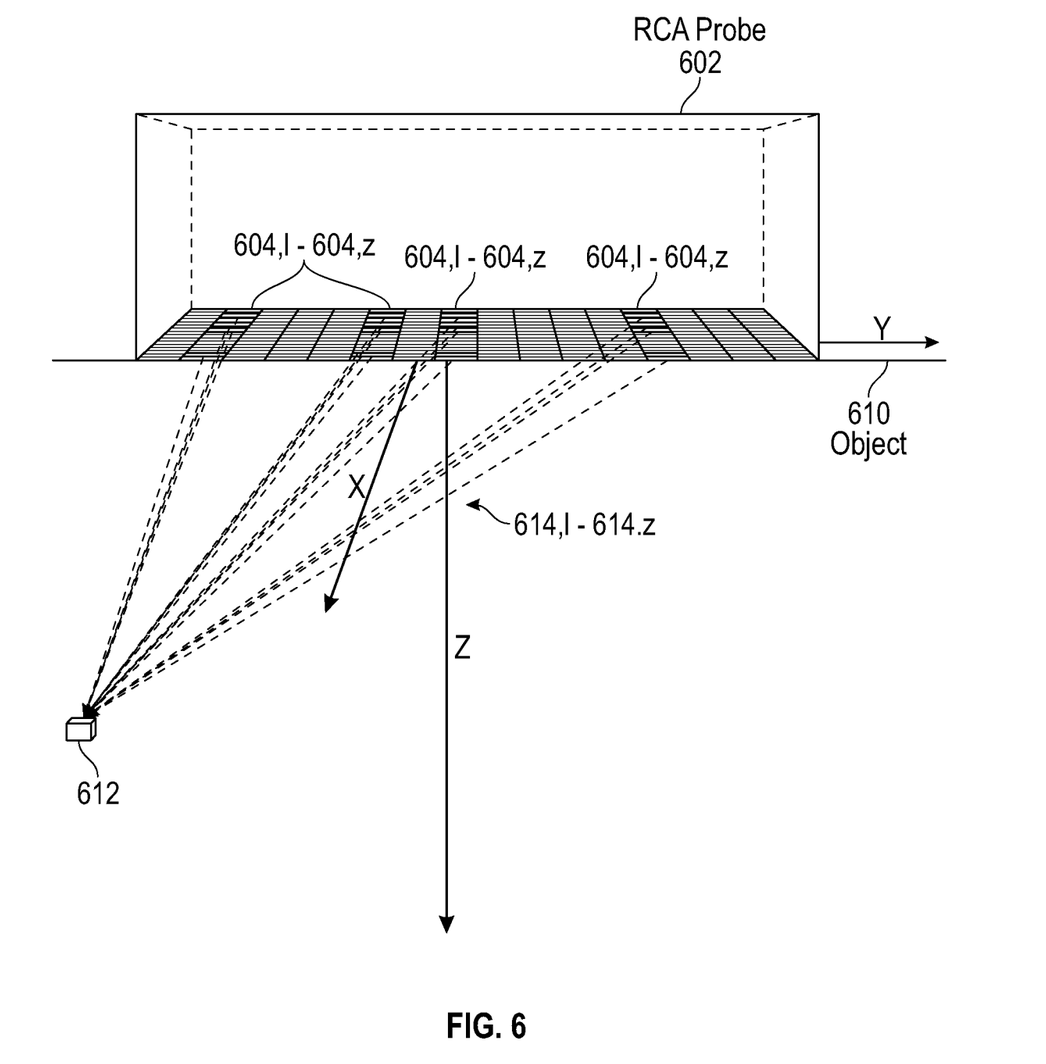
FIG. 6 illustrates propagation paths according to an example of the present subject matter.

Having multiple, separate transmission apertures may allow an RCA probe to perform volumetric inspection of an object using a time of flight (TOF) characteristics of the transmitted pulses. FIG. 6 illustrates the propagation paths of the pulses transmitted from multiple apertures to a select position, according to an example of the present subject matter. Here, the RCA probe 602 may be placed on a surface (in the x-y plane) of an object 610 (e.g., object-under-test). The RCA probe 602 may include non-adjacent active elements 604.1-604.Z, which may each transmit an acoustic pulse into the object 610. Position 612 may represent one position in the object, and position 612 may, in this example, be at non-transverse or non-longitudinal location with respect to the axis of the testing object. Position 612 may correspond to a voxel location in an image generated (e.g., TFM image) using the acoustic data.

Let's consider the example of when the active elements 604.1-604.Z transmit a pulse (or pulse sequence) synchronously (e.g., without delays). Each active element 604.1-604.Z may transmit a separate pulse at the same time (e.g., substantially contemporaneously) into the object 610. In this example, the pulses may be transmitted by the active elements 604.1-604.Z at substantially the same time. Those separate pulses may arrive at position 612 at separate times because their propagation paths 614.1-614.Z are of different distances (as shown in FIG. 6). The separate pulses may arrive based on the respective distance of the active elements used for transmission and position 612. Hence, at position 612, the transmitted pulses may be observed as a series of pulses encoded with specific TOF information associated with the respective set of distances corresponding to the location of position 612 in the object 610. The pulses transmitted by the active elements 604.1-604.Z may be observed as a transmitted pattern forming a unique code at position 612.

Now, let's also consider a reflecting structure being present at position 612. The transmitted pattern of pulses received at position 612 may then be reflected back to the probe 602. The reflected signal may also include the TOF information of the different pulses. Accordingly, by monitoring the signal reflected from position 612 and decoding the reflected signal, total focusing in emission and reception may be achieved. The reflected signal may reflect the transmitted pattern of pulses, and therefore, the reflected signal may be compared to a predicted pattern (or code) corresponding to position 612. The predicted pattern (or code) may be the expected sequence of pulses to be received by the RCA array based on the transmitted pattern if position 612 includes a reflecting structure. Based on the comparison, the presence or absence of a reflecting structure (e.g., flaw) at position 612 may be determined.

In an example, delays may be used in transmitting the pulses with the active elements 604.1-604.Z. The effect of the delays may be taken into account in determining the predicted pattern (code) observed at respective positions in the inspection volume.

Figure 7:
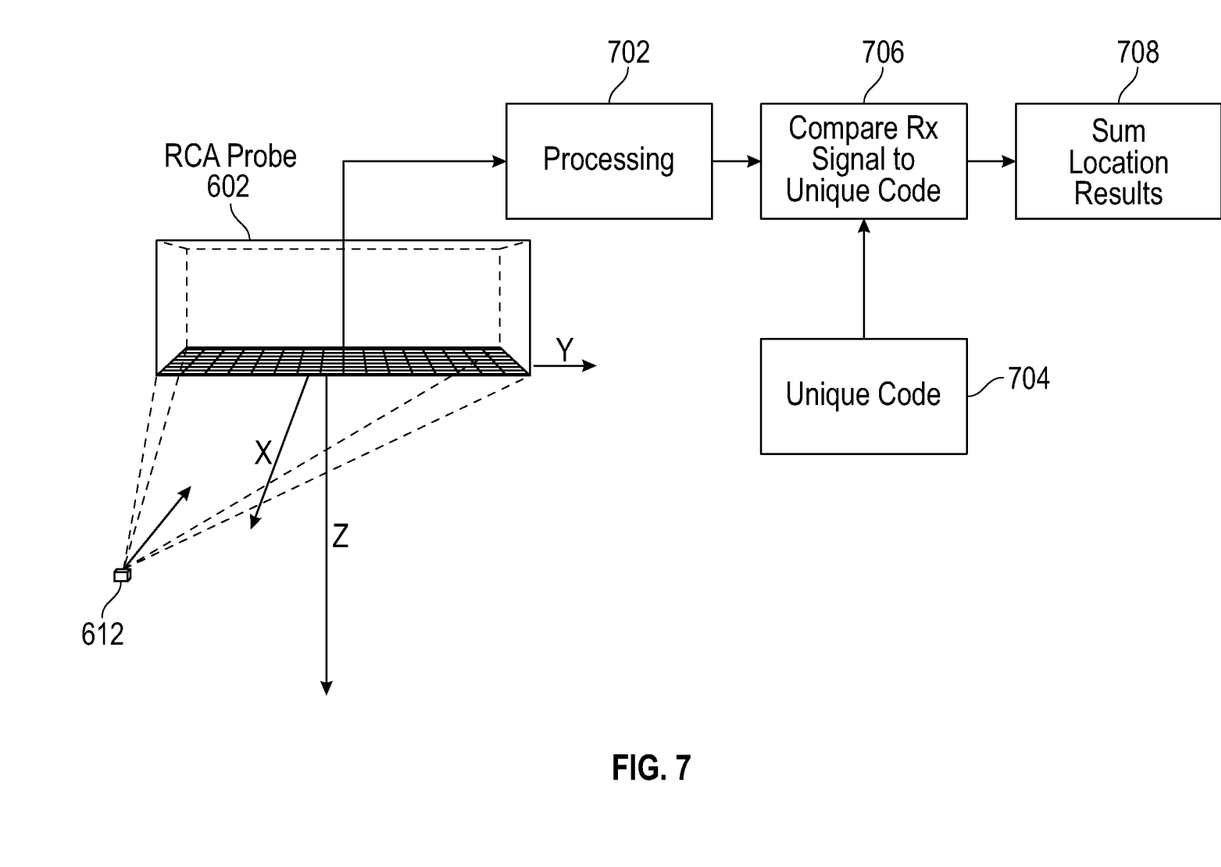
FIG. 7 illustrates a high-level reception and decoding process according to an example of the present subject matter.

FIG. 7 illustrates a high-level reception and decoding process, according to an example of present subject matter. Here, in response to transmitting a pulse (or pulse sequence) using multiple, separate transmission apertures, such as by using active elements 604.1-604Z of FIG. 6 described above, the RCA probe 602 may receive a reflected signal (e.g., a representation of the reflected signal). The RCA probe 602 may utilize a subset of elements to receive the reflected signal, as described in further detail below. The subset of elements to receive the reflected signal may be different from the subset of elements used to transmit the pulse (e.g., elements 604.1-604.Z). The reflected signal may include a series of A-scans, which are time series representations of acoustic data received by the RCA probe 602.

At 702, the reflected signal received by the RCA probe may be processed. The reflected signal may be summed for focalization. For example, the A-scans may be summed (with or without calculated delays).

At 704, the predicted pattern (or unique code) corresponding to the transmitted pulse (or pulse sequence) may be generated for a designated location, e.g., position 612. The predicted pattern (or unique code) may represent the expected pattern of reflected echoes received by the RCA probe 602 if a reflector is present at the designated location based on TOF of the pulses transmitted from the different active elements (604.1-604.Z). In other words, the predicted pattern includes the echo signals reflected by the hypothetical reflector in response to the transmitted pulse (or pulse sequence).

At 706, the processed reflected signal (e.g., summed) may be compared to the predicted pattern for the designated location. Based on the comparison, the presence or absence of a reflecting structure (e.g., flaw) at the designated location (e.g., position 612) may be determined. The result of the comparison may then be used to generate a corresponding pixel of an image representing the result of a volumetric inspection. This process of generating and using a predicted pattern per location and comparing them to the processed reflected signal (e.g., steps 702-706) may be repeated for different designated locations. For example, for a TFM image, the process may be repeated per voxel; for a PAUT image, the process may be repeated per angle and distance along this angle. At 708, the results of the process for the different locations may be combined to generate the final image.

Utilizing the full RCA array at reception may cause the creation of linear probe (e.g., switching all grounds lines on). Therefore, different reception contexts may be utilized. A reception context may correspond to using a subset of active elements for reception at a given time. In an example, a reception context may correspond to using a row (or column) in the RCA array, and to use the full RCA array, the number of reception contexts may correspond to the number of rows in the array. Other configurations for a reception context may also be used.

Figure 8:
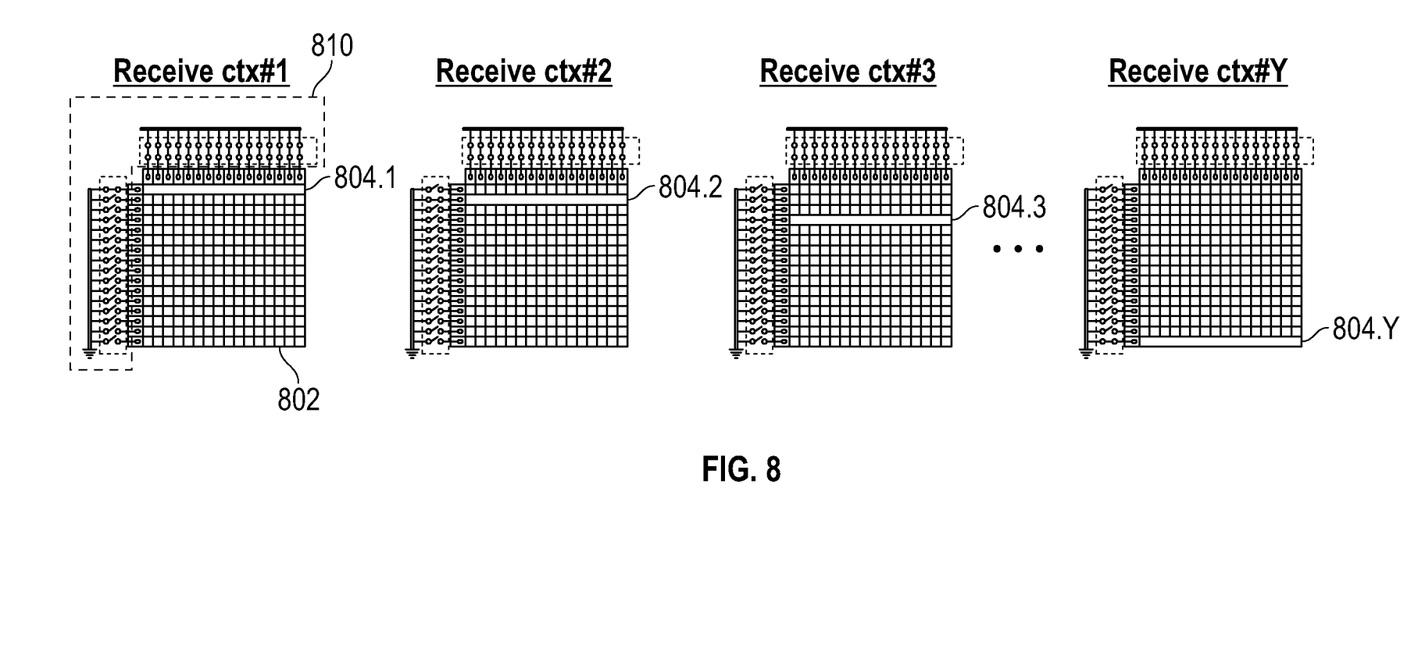
FIG. 8 illustrates reception contexts of an RCA array adapted for volumetric inspection according to an example of the present subject matter.

FIG. 8 illustrates reception contexts of an RCA array adapted for volumetric inspection, according to an example of present subject matter. Here, each reception context may correspond to a different row (or column) of a RCA array. Different reception contexts are used to receive respective reflected signals based on the same pulsing configuration. Here, in receive context 1, a control circuit 810, as described above, may activate the first row 804.1 of an RCA array 802 for reception by connecting the active elements of that row to the output of the RCA array and ground while keeping the elements of the remaining rows in a high impedance state, as described above. In receive context 2, the control circuit 810 may activate a second row 804.2 of the RCA array. In receive context 3, the control circuit 810 may activate a third row 804.3 of the RCA array and so on until the elements of the last row 804.Y is activated in the last receive context Y. Therefore, if the RCA array 802 includes 16 rows, there may be 16 receive contexts.

The same transmission pulse configuration may be used with each receive context. That is, a pulse (or pulse sequence) may be transmitted and then the reflected signal may be received using receive context 1. Next, the same pulse (or pulse sequence) may be transmitted again and the reflected signal may be received using receive context 2 and so on until a last transmitted pulse (or pulse sequence) is received using the last receive context. A set time in between pulse transmissions may be used to allow for the echoes in the object to dissipate.

Figure 9:
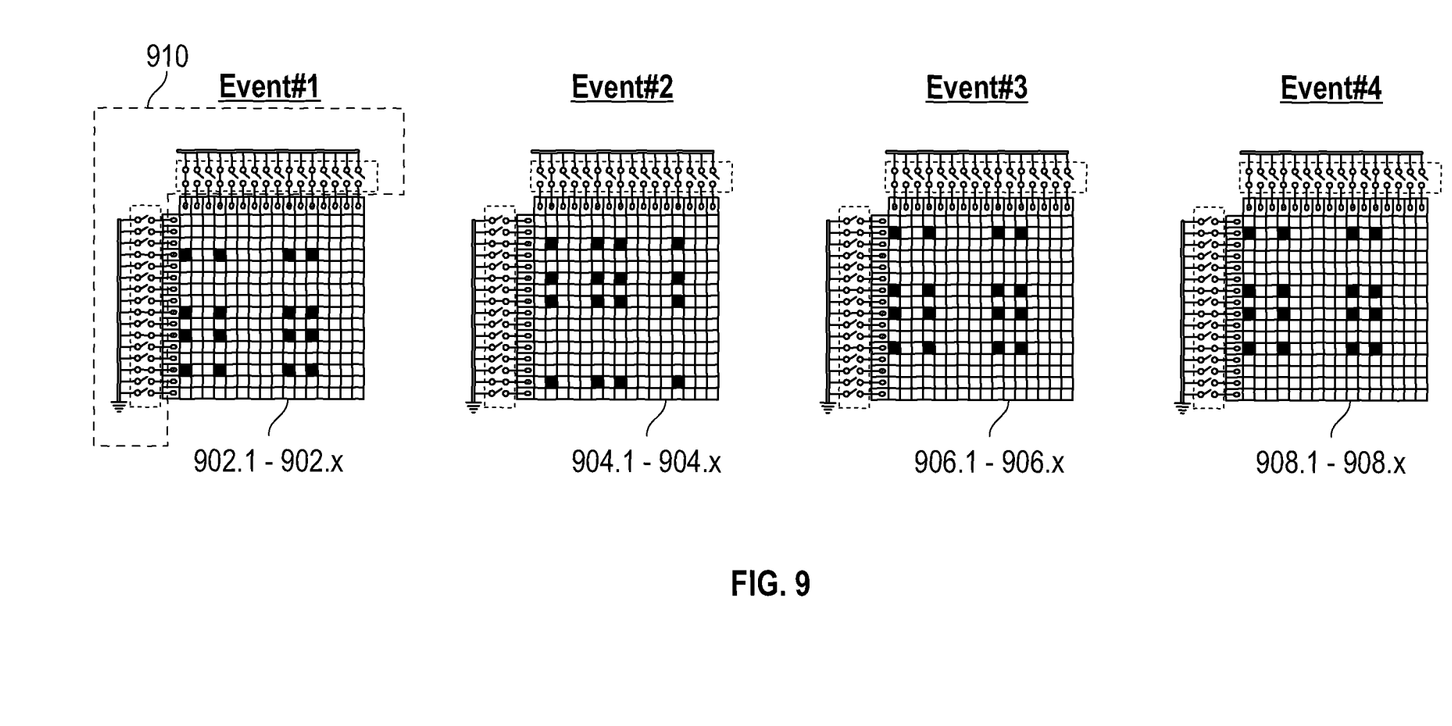
FIG. 9 illustrates multiple pulse transmission events according to an example of the present subject matter.

Moreover, for each receive context, multiple pulse transmission events (e.g., pulse sequence) may be used. FIG. 9 illustrates multiple pulse transmission events, according to an example of present subject matter. Here, each pulse transmission event (also referred to as pulser activation event) may use a different configuration of multiple, separate transmission apertures. An aperture may include one or more adjacent elements of the RCA array.

In pulse transmission event 1, a control circuit 910, as described above, may activate elements 902.1-902.$x$ such that each of the active elements 902.1-902.$x$ may transmit a pulse. In pulse transmission event 2, the control circuit 910 may activate elements 904.1-904.$x$ such that each of the active elements 904.1-904.$n$ may transmit a pulse. The configuration of the active elements 902.1-902.$x$ in the pulse transmission event 1 may be different than the configuration of the active elements 904.1-904.$x$ in the pulse transmission event 2. In pulse transmission event 3, the control circuit 910 may activate elements 906.1-906.$x$ such that each of the active elements 906.1-906.$x$ may transmit a pulse. And in pulse transmission event 4, the control circuit 910 may activate elements 908.1-908.$x$ such that each of the active elements 906.1-908.$x$ may transmit a pulse.

The configuration of the active elements in each pulse transmission event may be unique, and each pulse transmission event may use a different set of active elements. Also, in an example, successive transmission event may not use adjacent active elements. That is, active elements 904.1-904.$x$ in pulse transmission event 2 may be non-adjacent to the active elements 902.1-902.$x$ used in pulse transmission event 1. In FIG. 9, four transmission events are shown for illustrative purposes only, and other number of transmission events may be used.

Figure 10:
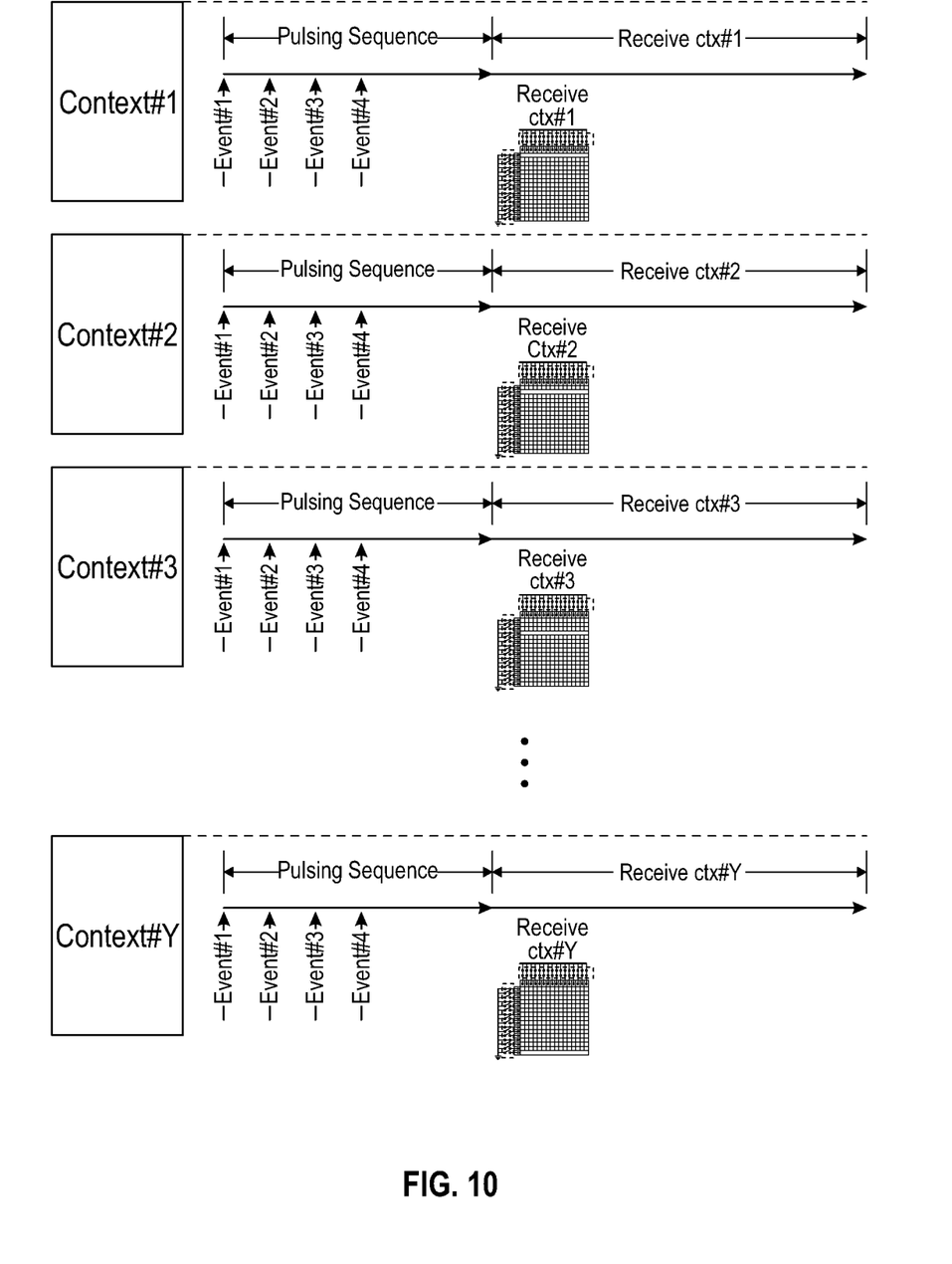
FIG. 10 illustrates an acquisition technique using multiple transmission events with multiple receive contexts according to an example of the present subject matter.

FIG. 10 illustrates an acquisition technique using multiple transmission events with multiple receive contexts, according to an example of the present subject matter. Here, the acquisition cycle may be divided into different acquisition contexts corresponding to the different receive context configurations, with each context having the same transmission pulse events. In acquisition context 1, a pulsing sequence is transmitted by using four pulse transmission events, as described above with reference to FIG. 9. Different number of pulse transmission events may be used, as described above. Next, the RCA array may be configured to receive context 1 (e.g., activating the first row of the RCA array), as described above with reference to FIG. 8, and the reflected signal may be received by the activated elements in receive context 1. In acquisition context 2, the same pulsing sequence as used in acquisition context 1 may be transmitted. Next, the RCA array may be configured to receive context 2 (e.g., activating the second row of the RCA array) and the reflected signal may be received by activated elements in receive context 2. This process of employing different acquisition contexts may be repeated until the last transmitted pulsing sequence, which is the same sequence used in all acquisition contexts, may be received by the activated elements in last receive context y (in the last acquisition context y), which in this example is 16 corresponding to the number of rows.

Figure 11:
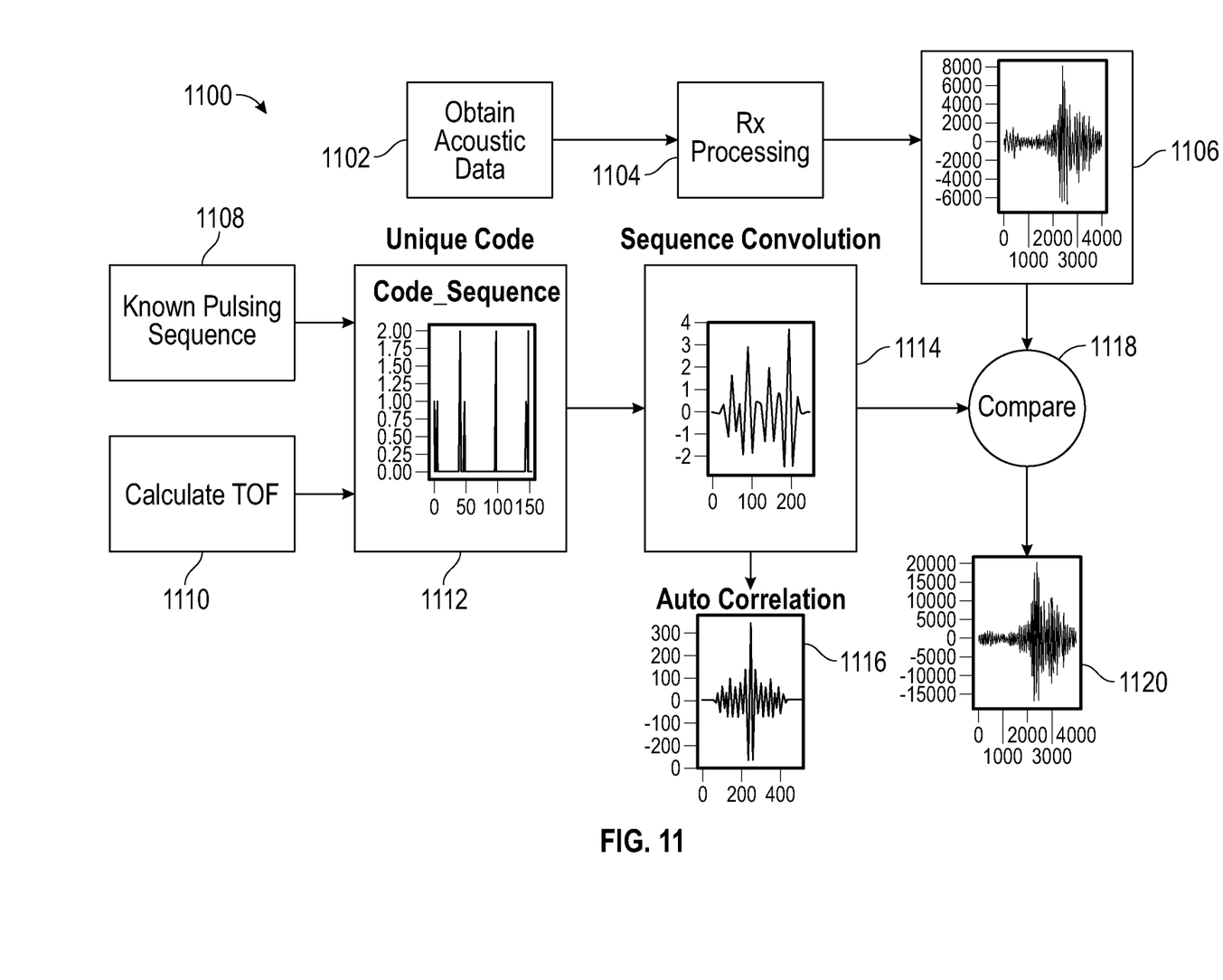
FIG. 11 illustrates a decoding process according to an example of the present subject matter.

FIG. 11 illustrates a decoding process 1100, according to an example of the present subject matter. Process 1100 is shown for receiving and decoding a PAUT image, but other types of images (e.g., TFM) may also be used, as described below. At 1102, raw acoustic data may be received in response to using different acquisition contexts, for example as described above with reference to FIG. 10. The raw acoustic data may be in the form of A-scans before beamforming in the example of PAUT. At 1104, the raw acoustic data may be processed. For example, summation may be performed on the raw acoustic data to generate a received pulse shape for a given beam/angle, as shown in received pulse shape 1106.

At 1108, the pulsing sequence used in the acquisition may be obtained. In this example, the obtained pulsing sequence may be four transmission pulsing events described above with reference to FIGS. 9 and 10. At 1110, for a given beamforming angle (or a voxel location for TFM or the like), TOF information for the different active elements used to transmit the pulsing sequence may be calculated. At 1112, based on the pulsing sequence and TOF information, a predicted pattern (or unique code) for the given beamforming angle may be generated. The predicted pattern (or code sequence) represent the expected pattern of reflected echoes received by the RCA array if a hypothetical reflector is present at the given angle based on TOF of the pulses transmitted from the different active elements.

At 1114, a convolution operation may be applied to the predicted pattern and a pulse shape to generate a convolved sequence. In 1116, auto-correlation may be performed to normalize the amplitude of the convolved sequence. The auto-correlation may represent a measure of noise induced by the decoding process. Auto correction may be used to measure the auto-correlation induced noise and can thus be used as a metric to optimize the pulse sequence in order to maximize the SNR for a given angle of the PAUT beam.

At 1118, the received pulse shape 1106 may be compared to the convolved sequence (generated in 1114). Based on the comparison, the decoded signal 1120 for that given beamforming angle may be generated. A similarity metric may be used to evaluate the degree of similarity between the received pulse shape 1106 and the convolved sequence. In an example, a cross-correlation function may be used to compare the received pulse shape 1106 and the convolved sequence. In another example, a neural network may be used to perform the comparison.

Based on the comparison, the presence or absence of a reflecting structure (e.g., flaw) at the given angle may be determined. The result of the comparison may then be used to generate an image representing the result of inspection for the given angle. This process may be repeated for different angles (or voxel location), and the results of the process for the different angles (or voxel locations) may be combined to generate the final image.

The volumetric inspection techniques described herein may be used in different applications. For example, they can be used in inspection applications for detecting flaws in an object under test such as a pipe. They can also be used in medical applications for monitoring inside human bodies (e.g., medical ultrasound).

VARIOUS NOTES

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations. The scope of the invention should be determined with reference to the appended claims, along with the full scope of equivalents to which such claims are entitled.

What is claimed is:

1. An apparatus comprising:
   a row-column addressed (RCA) array including a matrix of transducer elements arranged in rows and columns;
   a control circuit comprising outputs to generate, during a transmission event, transmission signals to drive a plurality of separate apertures in the RCA array, wherein the apertures are defined by a subset of the transducer elements within the RCA array;
   wherein, for the transmission event, the plurality of separate apertures include at least two adjacent apertures separated by at least one non-driven transducer element; and
   a processor coupled to a memory circuit, the processor configured to perform instructions stored by the memory circuit, the instructions to:
   obtain a representation of a reflected signal acquired in response to the pulse signal;
   compare the representation of the reflected signal to an expected pattern of reflected echoes for a location associated with an object based on positions the apertures in the RCA array used in the transmission event; and
   based on the comparing of the representation of the reflected signal to the expected pattern, determine a presence of a structure associated with the location.

2. The apparatus of claim 1, wherein the control circuit is configured to generate the transmission signals to excite the separate apertures substantially contemporaneously.

3. The apparatus of claim 1, the control circuit is configured to control the RCA array to receive reflections of the transmitted pulse signal using a different subset of the transducer elements than was used for the transmission event.

4. The apparatus of claim 3, wherein the different subset of the transducer elements defines a contiguous row or a contiguous column of the transducer elements in the RCA array.

5. The apparatus of claim 1, wherein the control circuit is configured to perform volumetric inspection of an object using a plurality of acquisition contexts, wherein respective ones of the acquisition contexts uses a common pulsing sequence shared between multiple acquisition contexts for transmission, and wherein respective ones of the acquisition contexts use different subsets of transducer elements for reception as compared to each other.

6. The apparatus of claim 5, wherein the common pulsing sequence includes a plurality of transmission events, and wherein respective transmission events amongst the plurality of transmission events use different subsets of transducer elements for transmission as compared to each other.

7. The apparatus of claim 5, wherein respective ones of the different subsets of transducer elements for reception correspond to different rows or columns of the RCA array.

8. The apparatus of claim 1, wherein the comparing is performed by determining a correlation metric between the representation of the reflected signal and the expected pattern of reflected echoes.

9. The apparatus of claim 1, further comprises instructions to:
   compare the representation of the reflected signal to a different expected pattern of reflected echoes for a different location associated with the object, and,
   based on the comparing the representation of the reflected signal to the different expected pattern, determining a presence of a structure associated with the different location; and
   based on determining the presence of the structures associated with the locations, generating an image.

10. A method comprising:
    in a transmission event, driving a plurality of separate apertures in a row-column addressed (RCA) array to transmit a pulse signal, the apertures being defined by a first subset of transducer elements of the RCA array,
    wherein for the transmission event, the separate apertures include at least two adjacent apertures separated by at least one non-driven transducer element;
    for reception, controlling the RCA array to receive reflections of the transmitted pulse using a second subset of transducer elements of the RCA array;
    converting the received reflections to a representation of a reflected signal;
    comparing the representation of the reflected signal to an expected pattern of reflected echoes for a location associated with an object based on positions of the first subset of transducer elements; and
    based on the comparing of the representation of the reflected signal to the expected pattern, determining a presence of a structure associated with the location.

11. The method of claim 10, wherein the pulse signal is transmitted by each of the apertures substantially contemporaneously.

12. The method of claim 10, wherein the second subset of transducer elements define a contiguous row or column of the RCA array.

13. The method of claim 10, wherein the comparing is performed by determining a correlation metric between the representation of the reflected signal and the expected pattern of reflected echoes.

14. An inspection system, comprising:
   a row-column addressed (RCA) array with a plurality of transducer elements to transmit and receive ultrasound waves;
   a control circuit configured to control the RCA array to perform volumetric inspection of an object using a plurality of acquisition contexts,
   wherein in each acquisition context, the control circuit is configured to drive the RCA array to transmit a common pulsing sequence using separate apertures, and
   wherein each acquisition context uses a different subset of transducer elements of the RCA array for reception as compared to each other; and
   a processor coupled to a memory circuit, the processor configured to perform instructions stored by the memory circuit, the instructions to:
   obtain a representation of a reflected signal based on echo signals received in the plurality of acquisition contexts, for a plurality of locations associated with the object:
      compare the representation of the reflected signal to an expected pattern of reflected echoes for a respective location associated with the object based on positions of transducer elements used to transmit the common pulsing sequence, and
      based on the comparing of the representation of the reflected signal to the expected pattern, determine a presence of a structure associated with the respective locations.

15. The inspection system of claim 14, wherein the common pulsing sequence includes a plurality of transmission events, each transmission event amongst the plurality of transmission events using a different subset of transducer elements for transmission as compared to each other.

16. The inspection system of claim 14, wherein each of the different subset of transducer elements for reception correspond to a different row or column of the RCA array.

17. The inspection system of claim 14, wherein the comparing is performed by determining a correlation metric between the representation of the reflected signal and the expected pattern of reflected echoes.

* * * * *